W. Fuzzard,
Steam Trap.

Nº 55,081.   Patented May 29, 1866.

Witnesses;

Inventor;
William Fuzzard
Per
Attorneys

UNITED STATES PATENT OFFICE.

WILLIAM FUZZARD, OF CHELSEA, MASSACHUSETTS.

IMPROVEMENT IN STEAM-TRAPS.

Specification forming part of Letters Patent No. 55,081, dated May 29, 1866.

*To all whom it may concern:*

Be it known that I, WILLIAM FUZZARD, of Chelsea, in the county of Suffolk and State of Massachusetts, have invented a new and Improved Steam-Trap; and I do hereby declare that the following is a full, clear, and exact description thereof, which will enable others skilled in the art to make and use the same, reference being had to the accompanying drawings, forming a part of this specification, in which—

Figure 1:
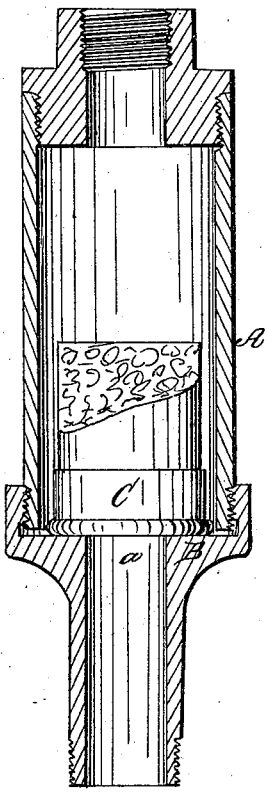
Figure 2:
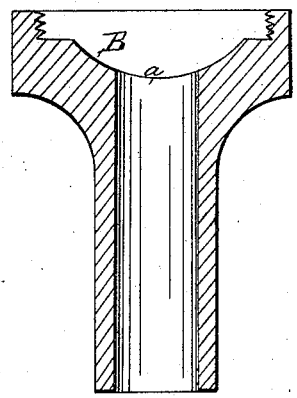

Figure 1 represents a longitudinal central section of this invention. Fig. 2 is a similar section of a modification thereof.

Similar letters of reference indicate like parts.

This invention consists in the arrangement of a buoyant stopper, made of cork or other material of less specific gravity than water, and placed in the exhaust-chamber, which is provided with a suitable seat at its bottom in such a manner that when steam passes into the exhaust-chamber the buoyant stopper is depressed on its seat by its own gravity, assisted by the pressure of the steam; but if water accumulates in the exhaust-chamber, the buoyant stopper begins to float and the water has a chance to escape.

A represents the exhaust-chamber of a steam-coil or other device, which is heated by steam, and which is to be provided with a suitable steam-trap. This chamber is made of brass, iron, or other suitable material, and it is provided at its bottom with a flat or concave seat, B, for the buoyant stopper C. The seat is generally made so that it can be detached from the chamber, and it may be flat, as shown in Fig. 1, or concave, as shown in Fig. 2, or of any other desirable form or shape.

The buoyant stopper C is made of cork or other suitable material lighter than water, and it is placed loosely into the chamber A, so that the same, when the chamber is empty or filled with steam, will sink down on its seat and close the discharge-opening *a*.

If water accumulates in the chamber A, the buoyant stopper floats off from the discharge-opening and the water has a chance to escape.

By this arrangement the waste of steam can be effectually prevented and a steam-coil can be heated with the greatest possible economy.

The trap is very simple in its construction, it can be easily connected to a steam-coil of any desired construction, and it is not liable to get out of order.

What I claim as new, and desire to secure by Letters Patent, is—

The buoyant stopper C, in combination with the exhaust-chamber A and a suitable seat, B, in said chamber, substantially as and for the purpose described.

WILLIAM FUZZARD.

Witnesses:
JOHN F. HAINES,
I. SABINE.